United States Patent
Huber et al.

(10) Patent No.: US 10,780,911 B2
(45) Date of Patent: Sep. 22, 2020

(54) STEERING COLUMN FOR A MOTOR VEHICLE AND METHOD FOR PRODUCING A STEERING COLUMN

(71) Applicants: THYSSENKRUPP PRESTA AG, Eschen (LI); thyssenkrupp AG, Essen (DE)

(72) Inventors: Sebastian Huber, Göfis (AT); Francisco Sinis Jáuregui, Feldkirch (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 44 days.

(21) Appl. No.: 16/084,437

(22) PCT Filed: Mar. 9, 2017

(86) PCT No.: PCT/EP2017/055554
§ 371 (c)(1),
(2) Date: Sep. 12, 2018

(87) PCT Pub. No.: WO2017/157755
PCT Pub. Date: Sep. 21, 2017

(65) Prior Publication Data
US 2019/0077439 A1    Mar. 14, 2019

(30) Foreign Application Priority Data
Mar. 17, 2016  (DE) .......... 10 2016 204 411

(51) Int. Cl.
*B62D 1/184*    (2006.01)
*B21D 51/02*    (2006.01)
*B62D 1/185*    (2006.01)

(52) U.S. Cl.
CPC ............. *B62D 1/184* (2013.01); *B21D 51/02* (2013.01); *B62D 1/185* (2013.01)

(58) Field of Classification Search
CPC ........ B62D 1/184; B62D 51/02; B62D 1/185; B23P 15/00; B21D 53/88; B21D 19/00; B21D 41/026
(Continued)

(56) References Cited

U.S. PATENT DOCUMENTS 2,913,203 A * 11/1959 Bertling ................ F16L 3/00
                                                         248/67.7
4,516,296 A *  5/1985 Sherman ............... F16L 3/243
                                                          24/279
(Continued)

FOREIGN PATENT DOCUMENTS

DE   10 2011 054597 A   4/2013
DE   10 2013 021 201 A  6/2015
(Continued)

OTHER PUBLICATIONS

Translation of JP 2011105122 A. Accessed at www.espacenet.com on Jan. 4, 2020. (Year: 2011).*
(Continued)

*Primary Examiner* — Ruth Ilan
*Assistant Examiner* — Hilary L Johns
(74) *Attorney, Agent, or Firm* — thyssenkrupp North America, LLC

(57) ABSTRACT

A steering column includes a jacket tube with a clamping section with a slot extending longitudinally. A clamping collar has transversely opposed legs are interconnected via an arcuate section between which the clamping section of the jacket tube is at least partially accommodated. An actuating unit is arranged in the jacket tube, with a steering spindle rotatably mounted therein around the longitudinal (Continued)

axis. A clamp fixes the actuating unit longitudinally relative to the jacket tube and in a release position unclamps the clamping collar and frees the actuating unit longitudinally and presses the legs toward each other transversely to the longitudinal axis in the fixing position. Driver elements are arranged on the jacket tube in opposite edge regions of the slot, and the legs include contact elements which in the fixing position can be pressed against the outer sides of the driver elements.

18 Claims, 4 Drawing Sheets

(58) Field of Classification Search
USPC .............................. 74/493; 72/370.1, 370.11
See application file for complete search history.

(56) References Cited

U.S. PATENT DOCUMENTS

| | | | | |
|---|---|---|---|---|
| 5,121,894 A * | 6/1992 | Twork, Sr. | ................ | F16L 3/13 248/316.7 |
| 5,722,299 A * | 3/1998 | Yamamoto | ............. | B62D 1/184 280/775 |
| 5,813,289 A * | 9/1998 | Renick | ................... | B62D 1/184 280/775 |
| 6,751,996 B2 * | 6/2004 | Sausner | ................ | B21D 41/04 72/316 |
| 8,662,455 B2 * | 3/2014 | Hernandez | ................ | F16L 3/13 248/73 |
| 8,967,016 B2 * | 3/2015 | Uesaka | ................... | F16C 35/02 74/493 |
| 9,022,427 B2 * | 5/2015 | Schnitzer | ................ | F16C 35/00 280/775 |
| 2003/0052236 A1 * | 3/2003 | Vogel | .................... | F16L 21/065 248/74.1 |
| 2005/0189768 A1 * | 9/2005 | Avram | .................. | F16L 21/065 285/419 |
| 2013/0213174 A1 | 8/2013 | Suzuki | | |
| 2014/0346761 A1 * | 11/2014 | Schnitzer | ................ | F16C 35/00 280/779 |
| 2015/0159790 A1 * | 6/2015 | Markham | ............... | F16L 21/06 29/525.05 |

FOREIGN PATENT DOCUMENTS

| | | | |
|---|---|---|---|
| JP | 2011 105122 A | | 6/2011 |
| JP | 2011105122 A | * | 6/2011 |
| JP | 2013 82 373 A | | 5/2013 |
| WO | 2009013457 A | | 1/2009 |

OTHER PUBLICATIONS

English Translation of International Search Report issued in PCT/EP2017/055554, dated May 11, 2017 (dated May 22, 2017).

* cited by examiner

STEERING COLUMN FOR A MOTOR VEHICLE AND METHOD FOR PRODUCING A STEERING COLUMN

CROSS REFERENCE TO RELATED APPLICATIONS

This application is a U.S. National Stage Entry of International Patent Application Ser. No. PCT/EP2017/055554, filed Mar. 9, 2017, which claims priority to German Patent Application No. DE 10 2016 204 411.7, filed Mar. 17, 2016, the entire contents of both of which are incorporated herein by reference.

FIELD

The present disclosure generally relates to a steering column in a motor vehicle.

BACKGROUND

For adapting the steering wheel position to the sitting position of the driver of a motor vehicle length-adjustable steering columns are known, in which steering columns the steering wheel which is attached on the rear end of the steering spindle can be positioned in the longitudinal direction, i.e. in the direction of the steering-column longitudinal axis in the interior of the vehicle.

To this end, the actuating unit is arranged in a telescopically adjustable manner in the longitudinal direction in a jacket tube which is also referred to as the outer jacket tube or guide jacket and is connected to the vehicle body by means of a mounting or support unit. By means of a releasable clamping device, the actuating unit can be fastened in different longitudinal positions along the longitudinal axis, i.e. releasably fixed.

In the case of a generic-type steering column—as known for example from JP 2011 105122 A—the fixing is carried out by means of a clamping collar which in a clamping section encompasses the jacket tube. The clamping device, also referred as a fastening device, presses the legs of the clamping collar toward each other with a clamping force in the fixing position, as a result of which the clamping collar is tightened and clamped on the jacket tube which in the process is radially compressed in the clamping section which is longitudinally split by means of the slot. Consequently, the actuating unit is radially clamped in the clamping section and fixed in a frictionally engaging manner in the longitudinal direction relative to the jacket tube. In the open state—also referred to as the released position or disengaged position—the clamping force which is exerted upon the legs is relieved, as a result of which the clamping collar is unclamped and releases the clamping section so that the frictional engagement between jacket tube and actuating unit is released and a displacement of the actuating unit in relation to the jacket tube in the longitudinal direction is possible for setting the steering wheel position.

In said JP 2011 105122 A, the clamping collar is tightened during the clamping, wherein the legs are pressed toward each other in the radial direction and consequently are pressed against the jacket tube in the clamping section from the outside. As a result, the clamping force can be transferred from the clamping collar to the actuating unit, wherein their circumferential regions, which are split by the longitudinal slot, are pressed against the outer side of the actuating unit and connected thereto in a frictionally engaging manner. It is disadvantageous, however, that the force application from the clamping collar to the clamping region is carried out predominantly in the radial direction, and as a result a high local surface pressure, which is variably distributed over the circumference of the clamping section, can occur. Consequently, the clamping force is transferred onto the friction pair between jacket tube and actuating unit with a relatively low degree of efficiency. Accordingly, a relatively high clamping force has to be applied in order to achieve a reliable fixing of the actuating unit.

Thus a need exists for a steering column which enables an improved and more uniform clamping of the actuating unit in the clamping section of the jacket tube.

BRIEF DESCRIPTION OF THE FIGURES

FIG. 7b is a cross-sectional view through the jacket tube according to FIG. 7a.

DETAILED DESCRIPTION

Figure 1:
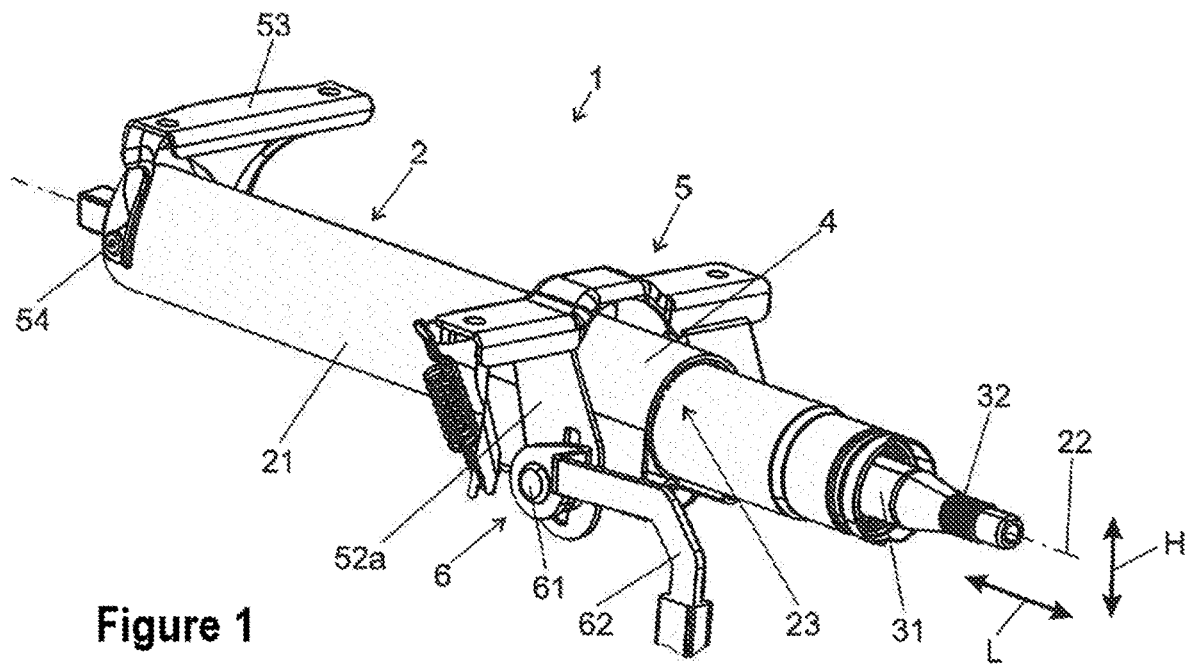
FIG. 1 is a perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, including a jacket unit with a jacket tube which includes at least one clamping section with a slot which extends in the direction of the longitudinal axis, a clamping collar, with two legs which lie opposite each other transversely to the longitudinal axis and are interconnected via an arcuate section, and between which the clamping section of the jacket tube is at least partially accommodated, an actuating unit arranged in the jacket tube with a steering spindle which is rotatably mounted therein around its longitudinal axis, a clamping device, which in a fixing position clamps the clamping collar on the jacket tube, wherein the clamping region is clamped on the actuating unit and fixes the actuating unit relative to the jacket tube in the direction of the longitudinal axis and in a release position unclamps the clamping collar and frees an adjustment of the actuating unit relative to the jacket tube in the direction of the longitudinal axis, wherein the clamping device presses the legs toward each other transversely to the longitudinal axis in the fixing position.

The invention also relates to a method for producing a jacket tube for a steering column and also for producing a steering column.

In some examples, the driver elements are arranged on the jacket tube in the oppositely disposed edge regions of the slot, and the legs, on their sides facing each other, have contact elements which in the fixing position can be pressed against the outer sides of the driver elements facing away from each other transversely to the longitudinal axis.

According to the invention, driver elements, which are arranged on both sides of the slot, are attached or formed on or in the clamping section. The driver elements project radially outward from the outer circumference of the jacket tube. They can preferably be arranged directly adjacent to the slot, i.e. along the edge regions of the slot which lie opposite each other in the circumferential direction so that within the gap of the slot width, that is to say the width of the slot measured transversely to the longitudinal axis, i.e. in the circumferential direction, the driver elements comprise inner sides which lie opposite each other.

The driver elements can be designed as radially protruding projections which can extend in certain sections over a part of the axial length of the slot or over its entire length. With regard to the slot, the driver elements are arranged in pairs in each case in the circumferential direction, i.e. oppositely disposed transversely to the longitudinal axis, wherein they comprise inner sides facing each other in each case, oppositely disposed on both sides of the slot, and outer sides facing away from the slot in the circumferential direction, which outer sides comprise in each case outer surface regions with an outwardly pointing surface normal basically tangentially to the outer circumference of the jacket tube, as seen from the slot.

The outer sides of a driver element are located facing away from the slot in each case, as seen in the circumferential direction, i.e. the outer sides of the oppositely disposed driver elements face away from each other in the circumferential direction. As seen from the longitudinal axis of the jacket tube, the outer sides extend in the main radially outward so that they cover the surface regions which lie parallel to a longitudinal plane in which lies the longitudinal axis and which extends through the slot.

Contact elements, which correspond to the driver elements, are arranged according to the invention on the clamping collar. The contact elements are positioned on the inner sides of the legs facing each other in the circumferential direction in such a way that the slot and the driver elements located on the edge of the slot lie between the oppositely disposed contact elements in the circumferential direction. In this case, the contact elements project from the legs so that with regard to the outer circumference of the clamping section they are oriented toward the driver elements predominantly in the tangential direction with regard to the outer circumference of the jacket tube. This has the result that during the fixing of the clamping device the contact elements, together with the inner sides of the legs which in the process are to be moved onto each other in the circumferential direction, are also to be moved onto each other, i.e. basically in the tangential direction with regard to the circumference of the jacket tube in the region of the slot. In the process, they contact in each case the outer sides of the oppositely disposed driver elements in the circumferential direction, i.e. in the tangential direction with regard to the outer circumference of the clamping section. Consequently, during the fixing of the clamping device they move the driver elements, which lie opposite each other in the circumferential direction, toward each other in the circumferential direction.

Accordingly, in the process the clamping force from the clamping device is transferred according to the invention via the legs of the clamping collar and via the contact sections of the clamping device chiefly in the circumferential direction or tangentially to the driver elements of the jacket tube so that the oppositely disposed edge regions of the slot are drawn toward each other. In other words, the clamping force acts according to the invention upon the edge regions in the direction of the slot width, i.e. it directly effects a reduction of the slot width. Consequently, the clamping force is introduced into the circumference of the jacket tube in the clamping region as a tensioning force. As a result, the clamping region is clamped flat against the outer circumference of the actuating unit almost over its entire circumference, less the width of the slot. In this way, a more efficient transfer of the clamping force from the clamping device via the clamping collar to the clamping section, and from the clamping section to the actuating unit, ensues.

As a result of the clamping force which according to the invention is introduced into the clamping section tangentially to the circumference, an advantageous more uniform force introduction over the circumference is also realized in contrast to the uneven high surface pressures in the case of the predominantly radial force introduction in the prior art.

The clamping collar can preferably be of basically U-shaped design. Understood by basically U-shaped is that the legs which are interconnected via the arcuate section are oriented ±10° parallel to each other. The legs are at a distance from each other, wherein a single gap is formed between the legs.

The clamping section preferably comprises just a single slot. This slot becomes narrower as a result of the transition of the clamping device from the release position into the fixing position.

In an advantageous development, it can be provided that the driver elements of the jacket tube and the contact elements of the collar can be interconnected by welding. After the welding operation, it can be provided that a mandrel is inserted into the jacket tube in order to accurately establish the inside diameter of the jacket tube. In other words, after the welding a calibration of the inside diameter of the jacket tube can be provided in order to compensate for distortion caused by welding.

The driver elements can preferably project radially outward from the jacket tube. The driver elements comprise oppositely disposed inner sides on both sides of the slot, which inner sides are preferably at a distance from each other within the gap of the slot width and comprise inner surface areas with surface normals which are basically oriented toward each other. On their outer sides facing away from the slot in the tangential or circumferential direction, surface areas are formed as driver surfaces with surface normals which are oriented away from each other and point mainly tangentially with regard to the jacket tube in the edge regions of the slot, which surface normals can be contacted by the contact elements basically in the tangential direction.

An advantageous embodiment of the invention provides that at least one driver element is designed as a bend of the jacket tube in at least one section of the edge region of the slot. In this case, a driver element is formed by an axial edge region of the slot, which extends in the direction of the longitudinal axis, i.e. in the longitudinal direction, being outwardly bent or turned over at least in certain sections with regard to the longitudinal axis so that the bent round edge section of the edge region forms a driver element. The bend can be made out approximately in the region of 90°+/−20° so that the oppositely disposed bent up edge surface areas in essence lie parallel to each other and to a longitudinal plane which extends through the slot and in which lies the longitudinal axis.

The driver elements can be designed in one piece with the jacket tube by forming of the jacket tube in the edge region of the slot, for example by a bending up or bending round, embossing, compression, curling or the like. In other words, the driver element and the jacket tube is a one-piece integral component. Alternatively, a rib, a flange or another projection can be fastened on the jacket tube.

The bending up of the wall of the jacket tube can preferably be carried out if the jacket tube is designed as a thin-walled steel tube, either as a seamless tube or as a sheet metal formed part.

As a result, the driver elements can be formed particularly efficiently with respect to production engineering by wall regions or sheet metal sections which are bent up in the radially outward direction.

The jacket tube can preferably be created from steel or an aluminum alloy.

One embodiment of the invention can provide that at least one contact element projects from a leg radially inward in the circumferential direction transversely to the longitudinal axis. In this case, it is possible that at least one contact element is formed on an end region, which is bent round toward the jacket tube, of at least one leg. According to the invention, the contact elements are added on the inner sides of the legs which face each other and are moved toward each other during the clamping of the clamping device. In this case, the contact elements preferably project inward to such extent that in the relaxed state of the clamping device they already lie against the outer sides of the driver elements. This can be realized for example by an end section on the free end of the leg being formed inward, for example bent round radially inward. The actual contact area of the contact element can then be formed on the edge of the formed area so that according to the invention it can contact a driver element by a driver surface on its outer side in the tangential direction.

It is advantageous that the clamping collar is designed as a sheet metal formed part, preferably as a one-piece integral component. This enables a rational production and a flexible shaping. The legs can be formed on a sheet metal blank together with the arcuate section. Furthermore, the free end regions of the legs can be bent round radially inward, wherein further forming can be carried out on the ends then pointing toward the jacket tube in order to form the contact element. By further forming, it can then especially be ensured that the contact element can be reliably moved toward the respectively corresponding driver element in the tangential direction during the clamping of the legs.

The clamping section is preferably formed in an end region of the jacket tube. The slot can then be formed as a slot which extends in the longitudinal direction parallel to the longitudinal axis and which is open toward one end of the jacket tube. The longitudinal slot consequently extends from one end of the jacket tube and can be introduced, for example milled, in a particularly simple manner from the end face in the longitudinal direction.

The clamping section preferably has a defined inside diameter which has a defined clearance in the radial direction relative to the outside diameter of the actuating unit. Consequently, a defined clamping behavior can be achieved during the fixing of the steering column. The inside diameter of the jacket tube in the clamping section is preferably calibrated during production.

For attaching the steering column in a vehicle, the jacket tube can be supported between two side cheeks of a support unit which can be attached to a vehicle body. Such support units are known and usually comprise two side cheeks which project transversely to the longitudinal axis and which also lie opposite each other transversely to the longitudinal axis and can accommodate the jacket tube between them. Owing to the fact that the side cheeks can be clamped by means of a clamping device, usually by the stated clamping device for the longitudinal adjustment, toward each other and therefore against the jacket tube from the outside, the jacket tube can be fixed on the support unit in a frictionally engaging manner. In this case, it is possible that the jacket tube is pivotably mounted around a pivot axis by its front end region facing away from the steering wheel and the fixing can be carried out at different positions within the extent of the side cheeks so that a height adjustment of the steering wheel position can be realized. In the case of the steering column according to the invention, the side cheeks can lie against the clamping collar from the outside, preferably in the region of the legs. During the fixing by means of the clamping device, the clamping collar is therefore fixed on the support unit, the jacket tube is fixed in the described manner on the clamping collar and the actuating unit is fixed in the jacket tube.

An advantageous embodiment of the invention provides that the clamping device comprises a clamping pin which passes through the legs transversely to the longitudinal axis and which is connected to a counter bearing and to a clamping gear, wherein the counter bearing is supported on the outside on the one leg and the clamping gear is supported on the outside on the other leg. The clamping gear can be designed in a known manner per se as a lift gear which is supported on the one leg from the outside and during operation of an operating element, as a rule a manually operable clamping lever, exerts an outwardly directed clamping force upon the clamping pin. As a result, the clamping pin, via the counter bearing which is supported on the outside on the other leg, pulls this other leg toward the one leg. Consequently, the clamping collar is clamped in a frictionally engaging manner between the legs. Such clamping devices are known in principle and as a lift gear can comprise for example a wedge gear, cam gear or tilting pin gear which converts a rotation of the clamping pin into a clamping stroke or a clamping force.

Alternatively to an operating lever, the clamping device can also be operated by means of a motorized drive.

In the invention, the clamping pin is preferably guided through openings in the oppositely disposed legs, which openings are located in the proximity of the end regions.

The clamping pin is preferably arranged orthogonally to the longitudinal axis and comprises a distance to the longitudinal axis.

When the jacket tube is retained in a support unit, the clamping pin can pass through the side cheeks of the support unit. The side cheeks preferably comprise elongated holes through which the clamping pin is guided and in which the clamping pin can be displaced in the vertical direction for adjustment of the height position.

The slot can comprise a widened section in the circumferential direction on at least one end. The widened section, in the end region of the slot within the longitudinal extent of the jacket tube, can comprise a slot region which extends in the circumferential direction, transversely to the longitudinal extent, so that the slot is of T-shaped design. Consequently, the effect is achieved of no undesirably high material stresses occurring in the end region of the slot during the clamping of the regions of the clamping section, separated from each other by the slot, on the actuating unit. A more uniform clamping in the fixing position is furthermore achieved as a result.

The invention also relates to a method for producing a jacket tube for a steering column which comprises a clamping section with a slot which extends from one end of the jacket tube in the direction of the longitudinal axis, characterized by the steps providing a tube section with a rough inside diameter and a rough outside diameter,
  introducing a slot into the tube section from one end in the axial direction, wherein the slot has a rough slot width between its oppositely disposed edge regions transversely to the longitudinal extent and has a slot length in the axial direction,
  bending up the edge regions of the slot radially outward for forming driver elements which project radially outward from the tube section, wherein the slot has a nominal slot width between the driver elements.

The tube section is provided as a blank in the length of the jacket tube, into which the slot is first of all introduced, for example by milling, from one end in the axial direction— synonymously referred to in the following text as the longitudinal direction, wherein the width of the milling is referred as the rough slot width. The rough inside diameter of the tube section does not initially have to be precisely adapted to the outside diameter of the actuating unit, conventional standard tube material with usual dimensional tolerances can be used.

Next, the oppositely disposed edge regions are bent up radially outward along a bend edge which extends parallel to the edges in the longitudinal direction, preferably by a bend angle of 90°+/−20°. The axial length of the bent up edge regions is smaller than, or equal to, the slot length.

The bent up edge regions project radially outward from the outside diameter of the tube section and form driver elements according to the invention. The slot extends between these driver elements, in other words the driver elements, as seen in the circumferential direction, lie opposite each other on both sides of the slot by their inner sides which face each other. Located on their sides which face away from each other in the circumferential direction, which consequently also face away from the slot, are the outer sides of the driver elements which, as explained above, comprise driver surfaces which are contactable in the circumferential direction or tangentially.

The implementation of the aforesaid method can preferably be carried out by a forming tool, comprising a mandrel with a radially projecting forming wedge, the width of which corresponds to the nominal slot width (plus the elastic recovery), being inserted into the tube section in the axial direction from the end over a clamping section length for the bending up of the edge regions, wherein the forming wedge is moved through the slot in the longitudinal direction.

The forming tool is inserted with the mandrel in the axial direction into the open tube cross section of the jacket tube, and immerses into the open end of the tube section by the desired clamping section length which is smaller than, or equal to, the slot length. In this case, the forming wedge is moved through the slot in the longitudinal direction. Owing to the fact that the forming wedge is wider than the rough slot width, and the edge regions of the slot cannot deflect radially inward toward the mandrel, they are bent up radially outward for forming the driver elements.

An advantage of the method according to the invention is that in a single forming step by an axial movement of the forming tool with the mandrel and forming wedge driver elements can be created in the clamping section of the jacket tube for realizing a steering column according to the invention.

An advantageous development of the method according to the invention comprises the compression of the tube section in the radial direction over a clamping section length to a nominal inside diameter which is smaller than the rough tube inside diameter.

The nominal inside diameter corresponds to the outside diameter of the actuating unit plus a predetermined clearance. During the compression, the jacket tube is calibrated in the clamping section to the dimension of the actuating unit.

Alternatively, it can also be provided that the nominal inside diameter is smaller than the outside diameter of the actuating unit, preferably comprising a small oversize in relation to each other. Therefore, a low-clearance or clearance-free seating of the actuating unit in the jacket tube can be realized when the clamping device is in the release position.

This method step can be realized in a particularly favorable manner by the forming tool comprising a sleeve which coaxially encompasses the mandrel, wherein the mandrel has an outside diameter which corresponds to the nominal inside diameter, and the sleeve has an inside diameter which corresponds to the outside diameter of the tube section which is compressed within the clamping length to the nominal inside diameter.

For the production, the forming tool, as described, is moved by the clamping section length in the axial direction toward the end of the jacket tube blank. As a result of the sleeve, the tube end is radially compressed in this case until it lies by its inner circumference against the mandrel. In this way, the jacket tube inside diameter is calibrated in the clamping section to the mandrel outside diameter which corresponds to the intended nominal inside diameter of the clamping section. During the radial compression, the jacket tube wall wants to spread into the free width of the slot in the circumferential direction, but it comes up against the forming wedge there which is moved along in the slot, as a result of which it is bent up radially outward.

In this way, the jacket tube can be calibrated in the clamping section and the driver elements can be formed in a particularly rational manner using the axial forming tool according to the invention in one production step.

Next, the introduction of a widened section in an end region of the slot, with a width in the circumferential direction which is greater than the rough slot width or the nominal slot width, can be carried out, for example by machining such as milling or the like. Consequently, the slot acquires a T-shape, as a result of which material stresses occurring in the end region of the slot during the fixing are reduced.

In the various figures, the same parts are always provided with the same designations and as a rule are therefore also named or mentioned only once in each case.

FIG. 1 shows a steering column 1, which comprises a jacket unit 2 with a jacket tube 21, in which is accommodated an actuating unit 3 with a steering spindle 31 which is rotatably mounted therein around the longitudinal axis 22. A steering wheel, not shown, can be fastened on a rear fastening section 32 with regard to the direction of travel.

The jacket tube 21, on its end region facing the viewer, comprises a clamping section 23 on which is arranged a clamping collar 4. In the clamping section 23, the jacket tube 21 comprises a slot 7 which extends parallel to the longitudinal axis 22 in the longitudinal direction and is open toward the rear end of the jacket tube 21—which is the end facing the viewer in FIGS. 1 to 4.

A support unit 5, with a support element 51 which can be attached on a vehicle body, not shown, accommodates the jacket tube 21 in the region of the clamping section 23 between two side cheeks 52a and 52b which project from the top transversely to the longitudinal axis 22. The clamping collar 4, which encompasses the clamping section 23 of the jacket tube 21, is located between the side cheeks 52a and 52b. The side cheek 52b comprises a stiffening section 521b so that the side cheek 52b is of a more flexurally rigid design than the side cheek 52a.

Figure 2:
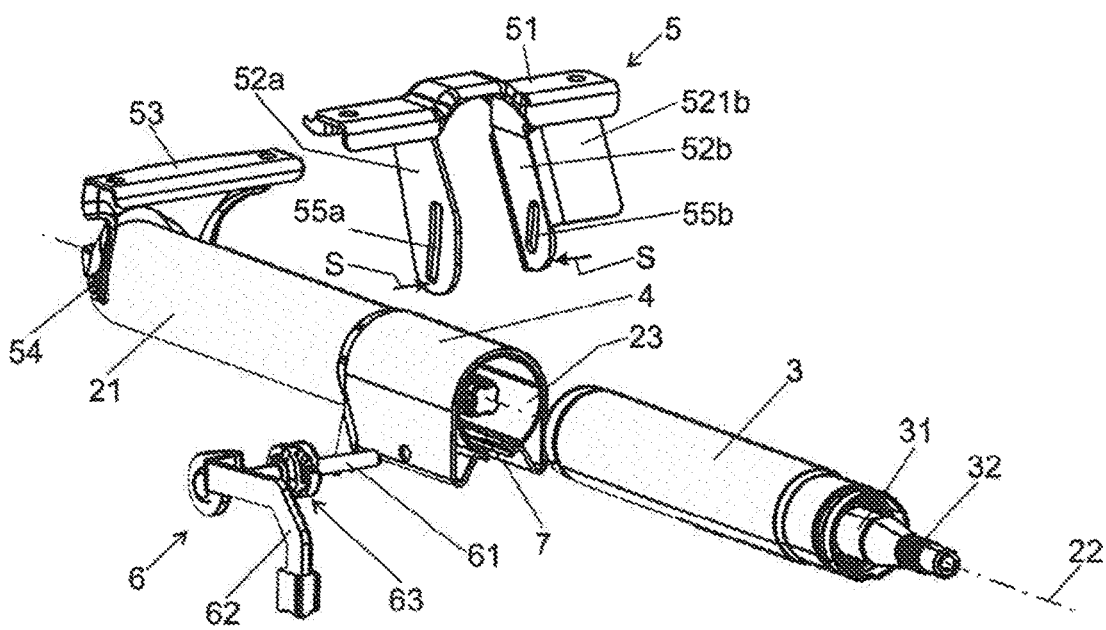
FIG. 2 is a partially exploded view of the steering column according to FIG. 1.
Figure 5:
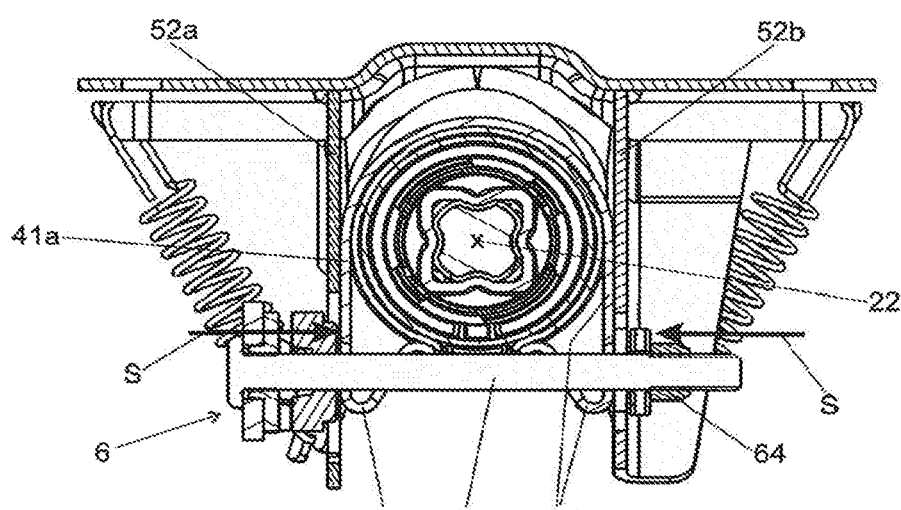
FIG. 5 is a cross-sectional view through the steering column according to FIG. 1.

A clamping device 6 comprises a clamping pin 61 which extends through openings 55a and 55b in the side cheeks 52a and 52b transversely to the longitudinal axis 22. Attached to the clamping pin 61 is an operating lever 62 by means of which it can be rotated manually around an axis. The clamping pin 61 is connected to a clamping gear 63 which is designed as a lift gear, for example a cam gear, a wedge gear or a tilting pin gear, and which is supported on the one side cheek 52a on the outside. Via a counter bearing 64 (see FIG. 5), the clamping pin 61 is supported on the other side cheek 52b on the outside on the side facing away from the viewer. If the clamping device 6 is brought into the fixing position by rotary operation of the operating lever 62, the clamping pin 61, by means of the clamping gear 63, is lifted out or drawn out relative to the side cheek 52a and in the process pulls the other side cheek 52b by the clamping force S toward the one side cheek 52a. In this case, the side cheeks 52a and 52b are pressed toward each other by the clamping force S in this way, as indicated in FIG. 2 and FIG. 5 by the force arrows S.

In the fixing position, the clamping collar 4, and with it the jacket tube 21, are clamped between the side cheeks 52a and 52b in a frictionally engaging manner. As a result of the clamping force S exerted in this case, the actuating unit 3 is also clamped in the clamping section 23 in a frictionally engaging manner, as is explained in more detail further down.

If the clamping device 6 is brought into a released or disengaged position, the clamping force S which is exerted upon the side cheeks 52a and 52b is relaxed, as a result of which the clamping collar 4 is unclamped and releases the clamping section 23 so that the frictional engagement between jacket tube 21 and actuating unit 3 is released. Consequently, a displacement of the actuating unit 3 in relation to the jacket tube 21 in the longitudinal direction L—parallel to the longitudinal axis 22—for adjustment of the steering wheel position is possible.

On a second support element 53, which can also be attached to the vehicle body, the rear end of the jacket tube 21 is pivotably mounted around a pivot axis 54 lying transversely to the longitudinal axis 22. In the released position of the clamping device 6, the jacket tube 21 can be pivoted around this pivot axis 54, wherein the clamping pin 61 can be moved in the vertical direction H in the slot-like openings 55a and 55b in order to adjust the height position of the steering wheel. In the fixing position, the jacket tube 21 is fixed via the clamping collar 4 on the side cheeks 52a and 52b in a frictionally engaging manner in the adjusted height position.

Figure 3:
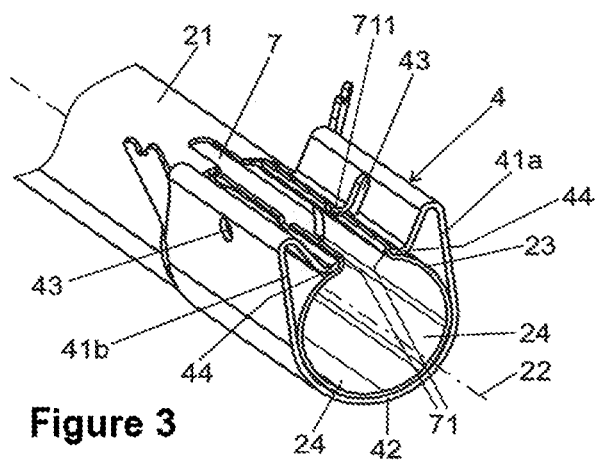
FIG. 3 is a detailed view of the steering column according to FIG. 2.
Figure 4:
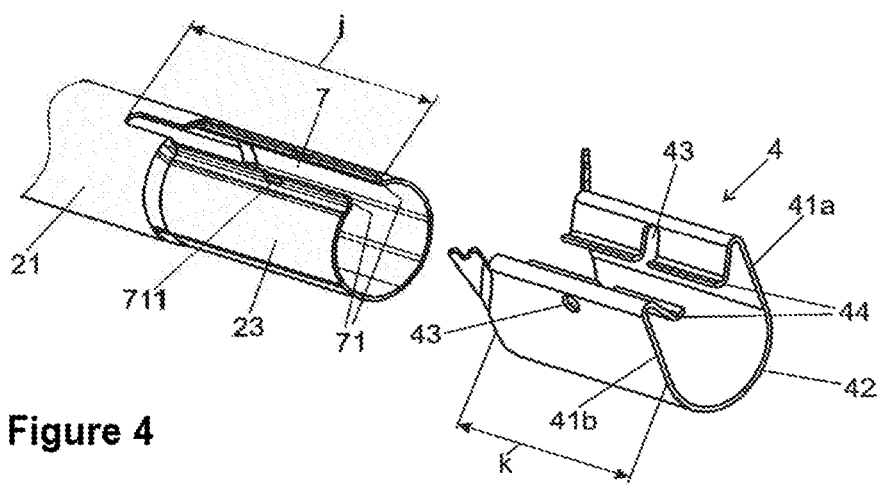
FIG. 4 is an exploded detailed view according to FIG. 3.

FIG. 3 shows a partial view of the jacket tube 21, where the clamping collar 4 encompasses the clamping section 23 which is formed in the rear end region of the jacket tube 21. FIG. 4 shows in the same perspective the clamping collar 4 removed from the clamping section 23 wherein it is shown withdrawn to the rear in the longitudinal direction L.

It can be seen in FIGS. 3 and 4 how the slot 7 extends over a length j in the longitudinal direction L from the open end of the jacket tube 21, i.e. is open toward this end. In the depicted example, the length j is greater than the length k of the clamping collar 4, which corresponds to the length of the clamping section 23. The clamping collar 4 has two legs 41a and 41b which lie opposite each other on both sides of the slot 7 and are interconnected via an arcuate section 42. In the region of their free ends, the legs 41a, 41b comprise an opening 43 through which passes the clamping pin 61 transversely to the longitudinal axis 22 in the assembled state according to FIG. 1, as can be gathered from the cross-sectional view of FIG. 5.

Figure 6:
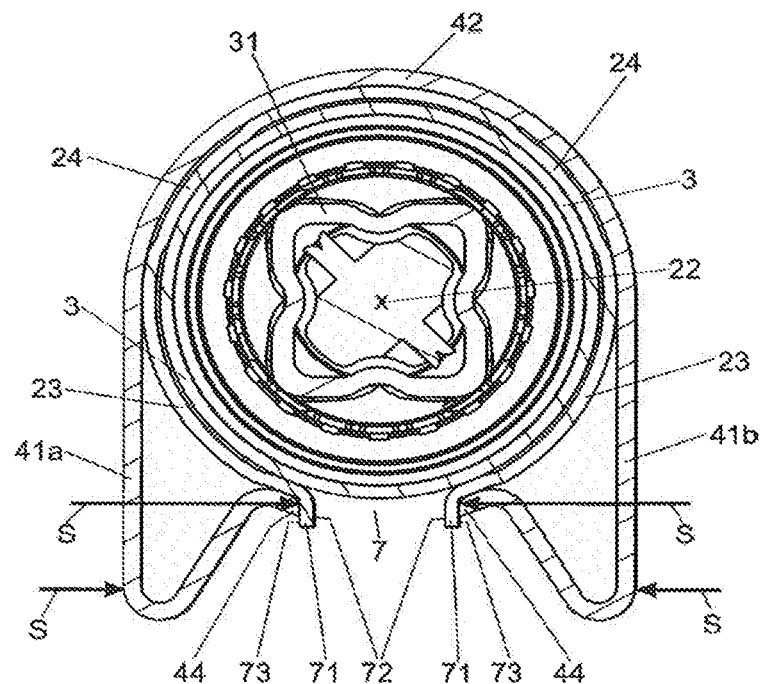
FIG. 6 is a cross-sectional view through the clamping section of the steering column according to FIG. 1.

Formed along the slot 7, along the oppositely disposed slot edges which extend in the longitudinal direction, are driver elements 71 according to the invention, which driver elements in the depicted example are formed by wall regions of the jacket tube 21 which are radially bent up outward by approximately 90°, as FIG. 6 shows. The driver elements 71 have inner surfaces 72 opposite each other in the circumferential direction—i.e. with regard to the circumference of the clamping section 23 in the tangential direction—and outer surfaces, which form contact surfaces 73, facing away from each other in the circumferential direction. The contact surfaces 73 and the inner surfaces 72 lie parallel to each other and to a longitudinal plane in which lies the longitudinal axis 22 and which extends radially outward through the middle of the slot 7. The driver element 71 comprises a cutout 711 through which the clamping pin 61 extends. In the case of a collision of the vehicle due to an accident, the possibility arises of the clamping pin 61 being supported on the edge of the driver element 71 in the direction of the longitudinal axis 22.

The free ends of the legs 41a and 41b are inwardly bent round for forming contact elements 44 which project up to the edge regions of the slot 7. There, the contact elements come up against the radially projecting contact surfaces 73 of the driver elements 71 in the circumferential direction, i.e. in the tangential direction with regard to the outer circumference of the jacket tube 21 in the clamping section 23.

If the clamping device 6 is brought into the fixing position, the clamping force S is applied from the outside to the legs 41a and 41b of the clamping collar 4 by the clamping pin 61 via the side cheeks 52a and 52b. Owing to the fact that the legs are supported by their contact elements 44 in the circumferential direction against the outer contact surfaces 73 of the driver elements 71, the driver elements 71 are pressed toward each other with the clamping force S by the oppositely disposed edges of the slot 7. In other words, the clamping force S works toward a reduction of the width of the slot 7, wherein the clamping force S is introduced into the circumference of the jacket tube 21 in the clamping section. In this way, according to the invention a force introduction, which is uniform over the circumference, is carried by the clamping collar 4 into the clamping section 23 which is correspondingly uniformly clamped on the actuating unit 3.

Arranged on the inner side of the clamping section 23 can be longitudinally extending clamping elements 24 which project radially inward, extend in a segment-like manner over a section of the circumference, are formed for example by radial end formings in the jacket tube 21, and enable a locally adapted force introduction of the clamping force S into the actuating unit 3.

A method according to the invention for producing a jacket tube 21 is explained in the following text with reference to production states shown schematically in FIG. 7a to FIG. 11.

Figure 7A:
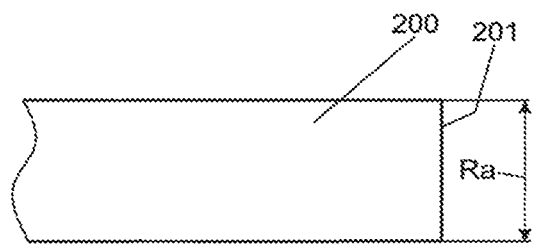
FIG. 7a is a schematic longitudinal view of a jacket tube in a first production state (jacket tube blank).
Figure 7B:
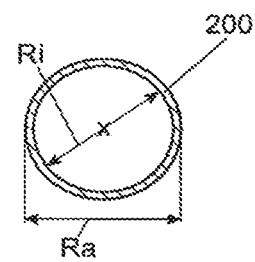

First of all, provision is made for a tube section 200, cut to size lengthwise, according to FIGS. 7a and 7b, which comprises a free end 201 and a rough outside diameter Ra and a rough inside diameter Ri.

Introduced into the tube section 200 from the free end 201, for example by milling, is a slot 700 which in the circumferential direction has a rough slot width bro and in the longitudinal direction a slot length j.

A forming tool 900, which has a mandrel 901 with a diameter Rs which corresponds to the diameter of the actuating unit 3, is positioned in front of the free end 201. Projecting radially from the mandrel 901 is a forming wedge 902 which has a width B measured in the circumferential direction. The width B coincides with the width of the finished slot 7, i.e. in FIG. 6 coincides with the gap between the inner surfaces 72 of the driver elements 71 in the circumferential direction.

The mandrel 901 is encompassed coaxially by a sleeve 903 which has an inside diameter Rh.

The inside diameter Rh of the sleeve 903 is smaller than the rough outside diameter Ra of the tube section: Rh<Ra.

The rough inside diameter Ri of the tube section 200 is larger than the diameter Rs of the mandrel 901 which corresponds to the diameter of the actuating unit: Ri>Rs.

The width B of the forming wedge 902 is preferably larger than the rough slot width bro, measured in each case in the circumferential direction: B>bro.

Figure 8:
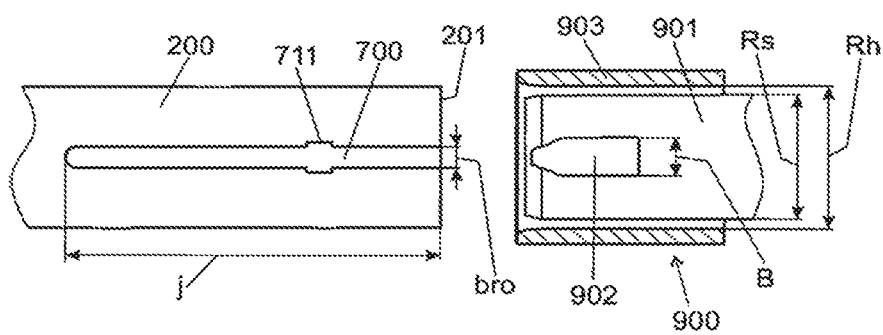
FIG. 8 is a schematic longitudinal view of a jacket tube in a second production state.
Figure 8A:
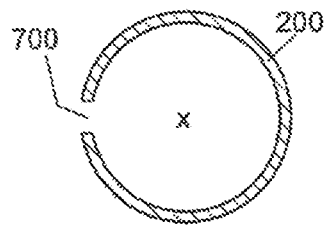
FIG. 8a is a cross-sectional view through the jacket tube according to FIG. 8.
Figure 8B:
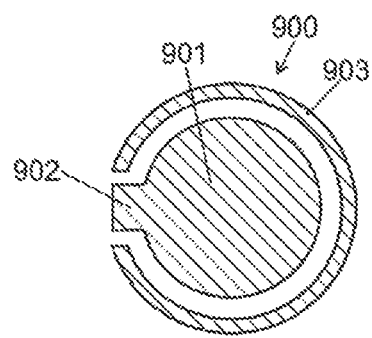
FIG. 8b is a cross-sectional view through the forming tool according to FIG. 8.
Figure 9:
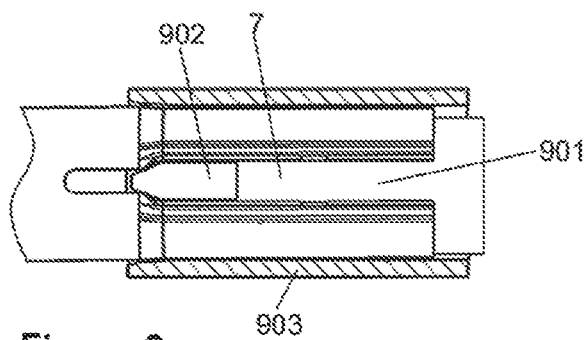
FIG. 9 is a schematic longitudinal view of a jacket tube in a third production state.

Starting from the situation shown in FIG. 8, the forming tool 900 is pressed onto the free end 201 in the axial direction, from right to left in the direction of the arrow in the figures, specifically basically by a length k which corresponds to the length of the clamping collar 4 and which corresponds to the length of the clamping section 23. This is illustrated in FIGS. 9.

By means of the sleeve 903, the tube section 200 is radially compressed to the sleeve inside diameter Rh, wherein the tube section 200 is pressed onto the mandrel 901 and like this acquires an inside diameter Rs. As a result, the clamping section 23 is formed and calibrated to this nominal inside diameter Rs.

During the previously described diameter calibration between the sleeve 903 and the mandrel 901, the wall of the tube section 200 spreads into the slot 700 in the circumferential direction, reducing the free rough slot width bro. There, the edge regions of the slot come up against the forming wedge 902 which is moved along in the slot 700 in the longitudinal direction. On account of the mandrel 901, which completely fills out the passage cross section of the compressed tube section 23, the referenced edge regions can get out of the way of the forming wedge 902 only radially outwardly. As a result, the edges of the slot 700 are outwardly bent up, forming the driver elements 71 which according to the invention project radially outward from the jacket tube 21 in the region of the clamping section 23. The slot 7 is consequently calibrated between the driver elements 71 to the slot width B corresponding to the width B of the forming wedge.

Figure 10:
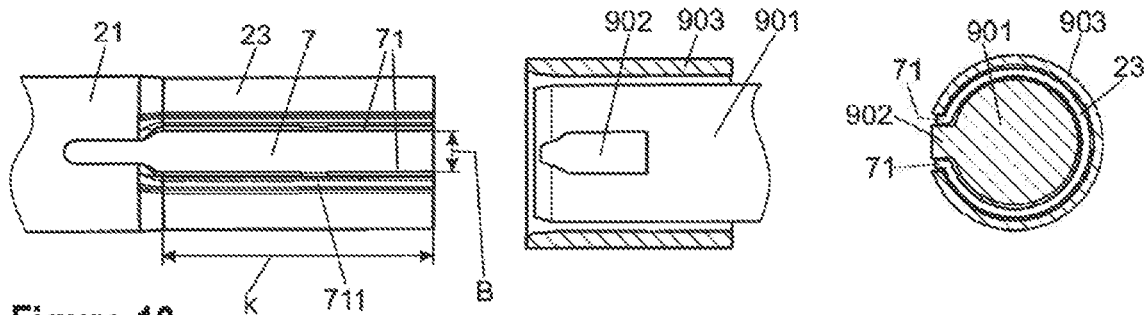
FIG. 10 is a schematic longitudinal view of a jacket tube in a production step following the production state according to FIG. 9.

The forming tool 900 is then withdrawn from the clamping section 23 of the jacket tube 21, which is shown in FIGS. 10.

Figure 11:
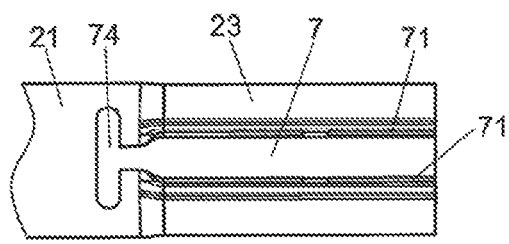
FIG. 11 is a schematic longitudinal view of a jacket tube in a fourth production state.

In FIG. 11, the slot 7 is finished off by a widened section 74 being introduced on its end facing away from the tube end 201 in the form of a slot section extending in the circumferential direction, introduced for example by machining such as milling or the like. Overall, the slot 7 consequently acquires its final T-shape which reduces the occurrence of undesirable local material stresses during the fixing of the clamping device 6.

What is claimed is:

1. A steering column for a motor vehicle, comprising:
   a jacket unit with a jacket tube, which comprises at least one clamping section with a slot which extends in the direction of a longitudinal axis,
   a clamping collar, with two legs which lie opposite each other transversely to the longitudinal axis and are interconnected via an arcuate section, and between which the clamping section of the jacket tube is at least partially accommodated,
   an actuating unit arranged in the jacket tube, with a steering spindle which is rotatably mounted therein around the longitudinal axis,
   a clamping device, which in a fixing position clamps the clamping collar on the jacket tube, wherein the clamping section is clamped on the actuating unit and fixes the actuating unit in the direction of the longitudinal axis relative to the jacket tube and in a release position unclamps the clamping collar and frees an adjustment of the actuating unit relative to the jacket tube in the direction of the longitudinal axis,
   wherein the clamping device presses the legs toward each other transversely to the longitudinal axis in the fixing position,
   wherein driver elements are arranged on the jacket tube in the oppositely disposed edge regions of the slot, and the legs, on their sides facing each other, comprise contact elements which are configured to, in the fixing position, be pressed against the outer sides of the driver elements, facing away from each other, transversely to the longitudinal axis,.
   wherein the slot narrows when the clamping device transitions from the release position to the fixing position.

2. The steering column of claim 1, wherein the driver elements project radially outward from the jacket tube.

3. The steering column of claim 1, wherein at least one of the driver elements is designed as a bend of the jacket tube in at least one section of the edge region of the slot.

4. The steering column of claim 1, wherein at least one of the contact elements projects inward in the circumferential direction from a leg transversely to the longitudinal axis.

5. The steering column of claim 1, wherein at least one of the contact elements is formed on an end region of at least one leg which is bent round toward the jacket tube.

6. The steering column of claim 1, wherein the clamping collar is a sheet metal formed part.

7. The steering column of claim 1, wherein the jacket tube is supported between two side cheeks of a support unit which is configured to be attached to a vehicle body.

8. The steering column of claim 1, wherein the clamping device further comprises a clamping pin which passes through the legs transversely to the longitudinal axis and which is connected to a counter bearing and to a clamping gear, wherein the counter bearing is supported on the outside on the one leg and the clamping gear is supported on the outside on the other leg.

9. The steering column of claim 1, wherein the slot comprises a widened section in the circumferential direction on at least one end.

10. A method for producing a steering column jacket tube which comprises a clamping section with a slot which extends from one end of the steering column jacket tube in the direction of a longitudinal axis and is configured to interact with a clamping collar of a steering column, the method comprising:
  providing a tube section with a rough inside diameter and a rough outside diameter,
  introducing a slot into the tube section from one end in the axial direction such that the slot is open to the end of the tube section, wherein the slot has a rough slot width between its oppositely disposed edge regions transversely to the longitudinal extent and has a slot length in the axial direction,
  bending up the edge regions of the slot radially outward to form driver elements which project outward from the tube section, wherein the slot has a nominal slot width between the driver elements.

11. The method of claim 10, comprising compressing the tube section in the radial direction over a clamping section length to a nominal inside diameter which is smaller than the rough inside diameter.

12. The method of claim 10, wherein for the bending up of the edge regions a forming tool, comprising a mandrel with a radially projecting forming wedge, the width of which corresponds to the nominal slot width, is inserted into the tube section in the axial direction from the end, wherein the forming wedge is moved through the slot.

13. The method of claim 12, wherein the forming tool comprises a sleeve which coaxially encompasses the mandrel, wherein the mandrel has an outside diameter which corresponds to the nominal inside diameter in the clamping section, and the sleeve has an inside diameter which corresponds to the outside diameter of the tube section which within the clamping section length is compressed to the nominal inside diameter.

14. The method of claim 1, comprising introducing a widened section into an end region of the slot with a width in the circumferential direction which is larger than the rough slot width or the nominal slot width.

15. A steering column for a motor vehicle, comprising:
  a jacket unit with a jacket tube, which comprises at least one clamping section with a slot which extends in the direction of a longitudinal axis,
  a clamping collar, with two legs which lie opposite each other transversely to the longitudinal axis and are interconnected via an arcuate section, and between which the clamping section of the jacket tube is at least partially accommodated,
  an actuating unit arranged in the jacket tube, with a steering spindle which is rotatably mounted therein around the longitudinal axis,
  a clamping device, which in a fixing position clamps the clamping collar on the jacket tube, wherein the clamping section is clamped on the actuating unit and fixes the actuating unit in the direction of the longitudinal axis relative to the jacket tube and in a release position unclamps the clamping collar and frees an adjustment of the actuating unit relative to the jacket tube in the direction of the longitudinal axis,
  wherein the clamping device presses the legs toward each other transversely to the longitudinal axis in the fixing position,
  wherein driver elements are arranged on the jacket tube in the oppositely disposed edge regions of the slot, and the legs, on their sides facing each other, comprise contact elements which are configured to, in the fixing position, be pressed against the outer sides of the driver elements, facing away from each other, transversely to the longitudinal axis,
  wherein in the fixing position the contact elements exert a force on the driver elements that is primarily tangential to a circumference of the clamping section of the jacket tube.

16. The steering column of claim 15 wherein in the fixing position the clamping device and the clamping collar cooperate to exert a force that is primarily tangential to the circumference of the clamping section of the jacket tube.

17. The steering column of claim 15 wherein in the fixing position the clamping device and the clamping collar force the driver elements of the clamping section towards one another thereby causing the clamping section to exert a uniform force about a circumference of the actuating unit.

18. The steering column of claim 15 wherein the slot is circumferentially equidistant from the contact elements of the legs of the clamping collar.

* * * * *